US007120621B2

(12) United States Patent
Bigus et al.

(10) Patent No.: US 7,120,621 B2
(45) Date of Patent: Oct. 10, 2006

(54) OBJECT-ORIENTED FRAMEWORK FOR GENERIC ADAPTIVE CONTROL

(75) Inventors: Joseph Phillip Bigus, Rochester, MN (US); Joseph L. Hellerstein, Ossining, NY (US); Sujay Parekh, White Plains, NY (US); Jeffrey Robert Pilgrim, Rochester, MN (US); Donald A. Schlosnagle, Rochester, MN (US); Mark S. Squillante, Pound Ridge, NY (US); Jayram S. Thathachar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 10/059,665

(22) Filed: Jan. 29, 2002

(65) Prior Publication Data
US 2003/0144983 A1 Jul. 31, 2003

(51) Int. Cl.
*G06F 17/30* (2006.01)
(52) U.S. Cl. .................................. 707/1; 707/2; 707/10
(58) Field of Classification Search ................ 707/100, 707/101, 103 R; 709/105; 717/4
See application file for complete search history.

(56) References Cited
U.S. PATENT DOCUMENTS

| 5,546,312 | A | | 8/1996 | Mozumder et al. |
| 6,145,121 | A | * | 11/2000 | Levy et al. ................... 717/135 |
| 6,192,354 | B1 | | 2/2001 | Bigus et al. |
| 6,199,068 | B1 | | 3/2001 | Carpenter |
| 6,401,080 | B1 | | 6/2002 | Bigus et al. |
| 6,718,358 | B1 | * | 4/2004 | Bigus et al. ................. 718/100 |
| 2001/0032029 | A1 | | 10/2001 | Kauffman |
| 2002/0165892 | A1 | * | 11/2002 | Grumann et al. ............ 709/100 |
| 2002/0198853 | A1 | | 12/2002 | Rose |
| 2003/0061265 | A1 | * | 3/2003 | Maso et al. .................. 709/105 |
| 2003/0084053 | A1 | * | 5/2003 | Govrin et al. ............... 707/100 |
| 2003/0126254 | A1 | * | 7/2003 | Cruickshank et al. ....... 709/224 |

* cited by examiner

*Primary Examiner*—Jeffrey Gaffin
*Assistant Examiner*—Neveen Abel-Jalil
(74) *Attorney, Agent, or Firm*—F.Chau & Associates LLC

(57) ABSTRACT

A system and method are described for constructing and implementing generic software agents for automated tuning of computer systems and applications. The framework defines the modules and interfaces to allow agents to be created in a modular fashion. The specifics of the target system are captured by adaptors that provide a uniform interface to the target system. Data in the agent is managed by a metric manager, and controller modules implement the desired control algorithms. The modular structure and common interfaces allow for the construction of generic agents that are applicable to a wide variety of target systems, and can use a wide variety of control algorithms.

24 Claims, 8 Drawing Sheets

OBJECT-ORIENTED FRAMEWORK FOR GENERIC ADAPTIVE CONTROL

BACKGROUND OF THE INVENTION

1. Technical Field

The present invention relates generally to the performance of computer systems and, in particular, to a system and method for automated performance tuning of computer systems and applications in a generic, application-independent manner.

2. Description of Related Art

There has been a tremendous growth in the complexity of distributed and networked systems in the past few years. In large part, this can be attributed to the exploitation of client-server architectures and other paradigms of distributed computing. Such computer systems and software (operating systems, middle ware and applications) have become so complex that it is difficult to configure them for optimal performance.

Complex applications such as databases (e.g., ORACLE, DB2), message queuing systems (e.g., MQSERIES) and application servers (e.g., WEBSPHERE, DOMINO) have literally tens and hundreds of parameters that control their configuration, behavior and performance (DOMINO/DB2 admin guide). The behavior of such a complex system is also governed by the dynamic loads that are placed on the system by the system users. It takes considerable expertise to set individual parameters, and it is even more challenging to understand the interaction between parameters and the resultant effect on the behavior and performance of the system. Another factor that increases the difficulty of administering these systems is that such systems can be very dynamic and therefore may require constant monitoring and adjustment of their parameters, for instance if the workloads change over time.

Thus, the total cost of ownership (TCO) of the particular system may increase not only due to the cost of hiring expert help, but also due to potentially lost revenue if the system is not configured properly. To reduce the TCO and the burden on system administrators, many software vendors are now turning to software agents to help manage the complexity of administering these complex systems.

Software agents are very well suited to the task of controlling such systems. Prior expert knowledge could be incorporated once and for all in the agent, thereby reducing the need for expertise by the end-user. In addition, the software agent can be more closely tied to the system and can perform even closer monitoring and updating than humanly possible. Recent advances in the fields of Control Theory, Optimization, Operations Research and Artificial Intelligence provide a wealth of algorithms and techniques to dynamically tune the behavior of complex systems, even in the absence of much expert knowledge.

A variety of target-specific or "customized automated tuning systems" (CATS) have been developed. Examples include systems by: (1) Abdelzaher et al., as described in "End-host Architecture for QoS-Adaptive Communication," IEEE Real-time Technology and Applications Symposium, Denver, Colo., June 1998, the disclosure of which is incorporated by reference herein; and (2) Aman et al., as described in "Adaptive algorithms for managing a distributed data processing workload," IBM Systems Journal, Vol. 36, No 2, 1997, the disclosure of which is incorporated by reference herein. The system of Abdelzaher et al. controls quality of service for the delivery of multimedia using task priorities in a communications subsystem. The system of Aman et al. provides a means by which administrators specify response time and throughput goals to achieve in MVS (Multiple Virtual Storage) systems using MVS-specific mechanisms to achieve these goals.

The concept of "tuning" seeks to improve service levels by adjusting existing resource allocations. To accomplish the preceding requires access to metrics and to the controls that determine resource allocations. In general, there are three classes of metrics, as follows: (1) "configuration metrics" that describe performance related features of the target that are not changed by adjusting tuning controls, such as, for example, line speeds, processor speeds, and memory sizes; (2) "workload metrics" that characterize the load on the target, such as, for example, arrival rates and service times; and (3) "service level metrics" that characterize the performance delivered, such as, for example, response times, queue lengths, and throughputs.

"Tuning controls" are parameters that adjust target resource allocations and hence change the target's performance characteristics. We give a few examples. LOTUS NOTES, an e-mail system and application framework, has a large set of controls. Among these are: $NSF_{13}$ BufferPoolSize for managing memory, Server_MaxSessions for controlling admission to the server, and Server_SessionTimeout for regulating the number of idle users. In Web-based applications that support differentiated services, there are tuning controls that determine routing fractions by service class and server type. MQ SERIES, a reliable transport mechanism in distributed systems, has controls for storage allocations and assigning priorities. Database products (e.g., IBM's DB/2) expose controls for sort indices and allocating buffer pool sizes.

CATS require that metrics and tuning controls be identified in advance so that mechanisms for their interpretation and adjustment can be incorporated into the automated tuning system. Thus, CATS construction and maintenance still require considerable expertise. With the advent of the Internet, software systems and their components evolve rapidly, as do the workloads that they process. Thus, it may well be that automated tuning systems must be updated on a rate approaching that at which tuning occurs. Under such circumstances, the value of automated tuning is severely diminished.

The prior art related to automated tuning has mostly focused on developing specific algorithms and architectures that are very tightly coupled to the target system (i.e., the system being controlled). In such cases, the algorithms cannot be easily reapplied to other systems, nor can other control schemes be inserted into the proposed architecture.

Existing prior art for target-independent automated tuning does not consider architectural support for access to the metrics and controls. Realizing generic, automated tuning requires well defined interfaces so that a generic automated tuning system can access the data required from the target. Previous work has ignored these considerations.

The search for appropriate settings of tuning controls is facilitated by exposing information about the semantics of metrics and the operation of tuning controls. In particular, it is helpful for the target to place metrics into the categories of configuration, workload, and service level. These designations can aid the construction of a generic system model. Further, there should be a way to express the directional effects of tuning control adjustments since having such knowledge reduces the complexity of the search for appropriate settings of tuning controls. Past work has not focused on these concerns.

SUMMARY OF THE INVENTION

The problems stated above, as well as other related problems of the prior art, are solved by the present invention, an object-oriented framework for generic adaptive control. The present invention may be applied to one or more target systems, such as, for example, one or more computer systems in a network.

Advantageously, the present invention provides a flexible software architecture for the creation of generic automated tuning agents (GATA), which are software agents that are made of one or more controller modules (also referred to herein as "Autotune Controllers"), and one or more target system (application) adaptors (also referred to herein as "Autotune Adaptors"). Moreover, the invention allows a user to specify the interfaces between the agent's components (controllers and adaptors) so that other components can be substituted in a plug-and-play manner. Also, the present invention provides interfaces that allow the controllers to be interconnected in an arbitrarily complex manner, allowing for the implementation (and composition) of any computable control strategy. Further, the present invention provides a mechanism to allow agents created in the framework to be interconnected and to communicate with each other to form a potentially complex network and/or hierarchy of software agents. Additionally, the present invention provides customizer interfaces that allow optional and flexible manual monitoring and intervention where necessary.

This architecture allows the implementation of many control strategies in the generic framework. Moreover, it allows the control strategy to be implemented in a modular fashion so that it is not necessarily tied to the target system. The modularity further allows the same control strategy to be easily applied to different target systems. The architecture is flexible enough to implement strategies requiring multiple controllers. In addition, it enables inter-agent communication that leverages the existing infrastructure (without requiring additional coding). This allows us to construct complex agent networks for controlling complex, distributed systems.

According to an aspect of the present invention, there is provided a tuning system for automatically tuning one or more target systems. A metric manager manages at least one set of metrics corresponding to the one or more target systems. One or more controllers implement one or more control strategies based upon the at least one set of metrics. The one or more control strategies are independent of a particular architecture of any of the one or more target systems. One or more adaptors interface with the one or more target systems with respect to the one or more control strategies. At least one of the one or more adaptors is specific to a corresponding one of the one or more target systems.

According to another aspect of the present invention, the tuning system further comprises at least one customizer for receiving user inputs for customizing at least one of the metric manager, the one or more controllers, and the one or more adaptors. The at least one customizer is a graphical user interface.

According to yet another aspect of the present invention, the one or more controllers comprise a master controller for resolving conflicts between the one or more control strategies.

According to still another aspect of the present invention, the tuning system has a capability of invoking other tuning systems to form a hierarchical tuning system with respect to the one or more target systems.

According to a further aspect of the present invention, the tuning system and the other tuning systems operate cooperatively to implement the one or more control strategies.

According to a yet further aspect of the present invention, at least some of the one or more controllers are modular and have a capability of being deleted from the tuning system, modified, or replaced.

According to a still further aspect of the present invention, at least some of the one or more adaptors are modular and have a capability of being deleted from the tuning system, modified, or replaced.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
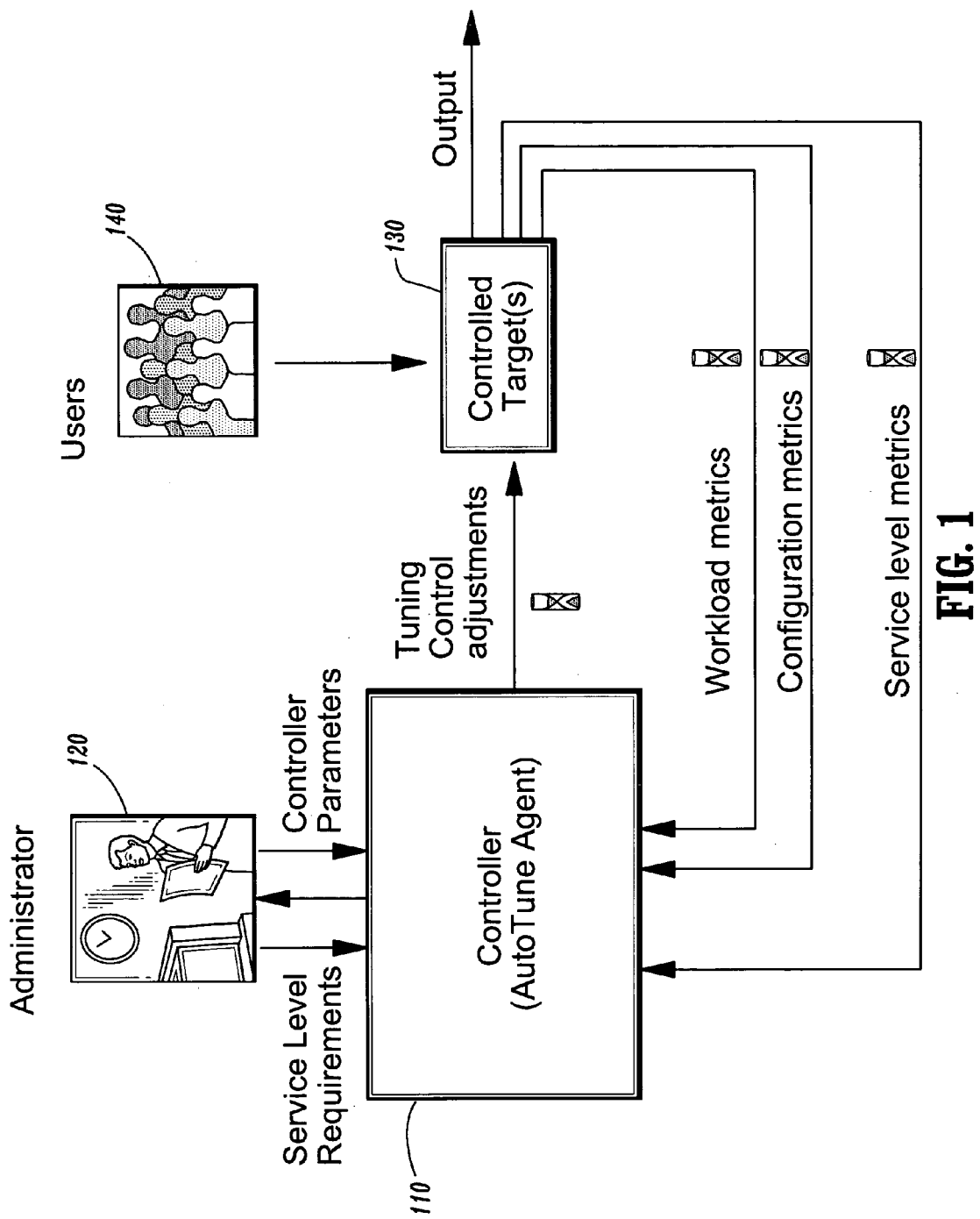
FIG. 1 is a block diagram depicting a typical operating environment to which a software agent according to the present invention may be applied, according to an illustrative embodiment of the present invention.

FIG. 1 is a block diagram depicting a typical operating environment to which a software agent according to the present invention may be applied, according to an illustrative embodiment of the present invention. The agent 110 receives information from a human (or software) administrator entity 120 in terms of the desired service-level requirements, as well as various parameters affecting the controller's operation. Other inputs to the agent 110 are received from the target application 130 itself, in terms of the configuration, workload and service level metrics, as discussed herein above. Using these inputs, the agent 110 computes the control settings for the target system or systems 130. These control settings are then passed on to the target system 130. Thus, we see that the agent 110 operates in a closed loop with respect to the target system 130. FIG. 1 also shows that the behavior of the target system 130 is governed by the workload imposed on it by the users 140. A final aspect of FIG. 1 is that the administrator 120, in addition to providing the controller parameters, has access to metrics related to the controller's operation. This can be used to monitor the automated agent 110, to ensure that it is behaving properly and to measure the efficiency of its operation.

Figure 2:
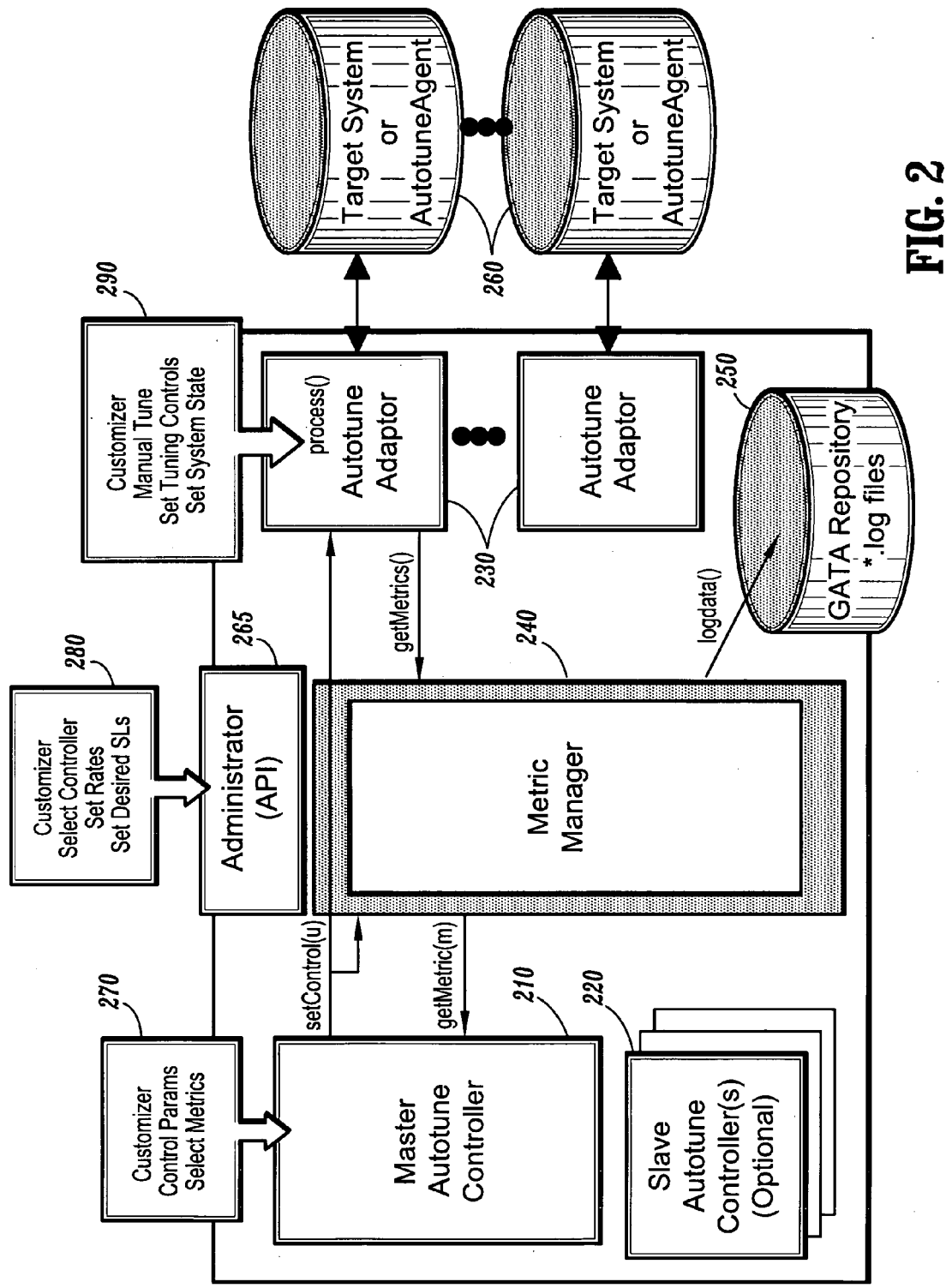
FIG. 2 is a block diagram illustrating the components comprising a software agent and interconnections corresponding thereto, according to an illustrative embodiment of the present invention.

The internal components of such an agent are outlined in FIG. 2. In particular, FIG. 2 is a block diagram illustrating the components comprising a software agent and interconnections corresponding thereto, according to an illustrative embodiment of the present invention. We call this agent architecture an Autotune Agent.

The software agent of FIG. 2 includes: a master Autotune Controller 210; one or more slave Autotune Controllers (hereinafter "slave Autotune Controller") 220; one or more Autotune Adaptors (hereinafter "Autotune Adaptor") 230; a repository 250; a metric manager 240; an administrator application programming interface (API) 265; customizers 270, 280, and 290. The software agent of FIG. 2 interacts with one or more target systems and/or one or more other Autotune Agents (hereinafter interchangeably referred to as "target system" or "other Autotune Agent" to illustrate that a software agent according to the present invention may interact with other agents as well as target systems which are not other agents) 260. The preceding illustrates that an Autotune agent can itself be a target system of another Autotune agent.

An Autotune Agent can be composed of one or more Autotune Controllers and one or more Autotune Adaptors. When there are multiple Autotune Controllers in the agent, one of them is designated the Master Controller 210 and is responsible for generating the final control action. Depending on the control algorithm, the Master Controller 210 may use any of the other (Slave) Controllers 220 as subroutines to help determine the desired control action.

Figure 3:
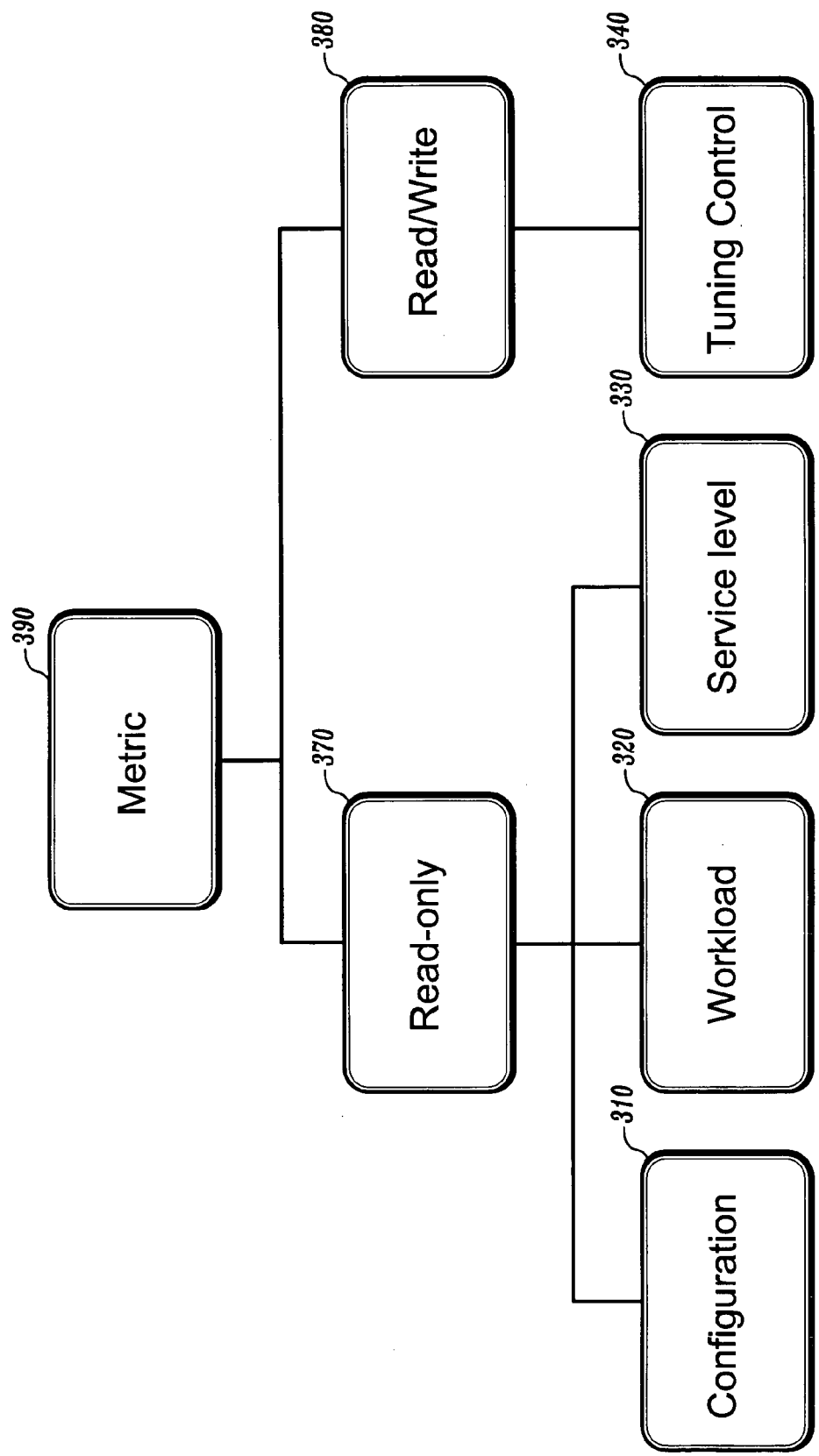
FIG. 3 is a tree illustrating a Metrics type hierarchy, according to an illustrative embodiment of the present invention.

FIG. 3 is a tree illustrating the type hierarchy of Metrics, according to an illustrative embodiment of the present invention. Metrics 390 are divided into read-only 370 and read/write metrics 380. In the illustrative embodiment of the present invention described herein, configuration 310, workload 320 and service level 330 metrics are read-only, whereas the Tuning Control 340 metrics are considered read/write metrics. Of course, other arrangements may be employed, while maintaining the spirit and scope of the present invention Metrics are managed through the Metric Manager 240. This entity provides interfaces to add, delete and list (getMetrics( ) in FIG. 2) the set of Metrics known to the agent. The Metric Manager 240 allows the Administrator, via the customizer 280 or the Administrator API 265, to select a subset of the known metrics to be logged to the repository 250, which can be used for logging purposes. The Metric Manager 240 provides a set of miscellaneous functions such as selecting the logging destination and enabling/disabling the logging function.

The Autotune Adaptor 230 is the interface of the Agent to the target application(s) 260. Each Autotune Adaptor 230 defines the set of Metrics that it knows about. This set can be obtained by querying the Autotune Adaptor 230 (getMetrics( ) in FIG. 2). For the read-only metrics, the Autotune Adaptor 230 provides a means of getting the latest value of those metrics from the target system 260 (process( ) in FIG. 2). For the Tuning Control metrics, the Autotune Adaptor 230 provides a means to set the value of that tuning control on the target system 260 (setControl( ) in FIG. 2). The Autotune Adaptor 230 is target-specific, and provides an abstraction so that the control algorithm itself need not be directly tied to a particular target system. In order to apply the same control algorithm to another target system, one need only substitute an Autotune Adaptor for that target system. Note that the target system 260 can be any external entity including, for example, another Autotune Agent. This property allows us to build a chain of agents, which we will utilize later to build an agent hierarchy.

An Autotune Controller 210, 220 implements a control strategy. The Autotune Controller 210, 220 obtains all metrics of interest from the Metric Manager (using getMetric( )). The Autotune Controller 210, 220 provides mechanisms to compute errors (deviations from the desired service level), compute new control values and to set those control values (by invoking the corresponding Autotune Adaptor 230 component via setControl( )).

A typical control loop is as follows:

1. If (synchronous mode), then:
   a. Invoke synchronous adaptors
2. Compute errors from desired service level
3. Compute new control value (this implements control algorithm)
4. If (current controller is the Master Autotune Controller 210), then:
   a. set the control value
5. Repeat It is to be appreciated that step 2 immediately above (compute errors) is an optional step. While most control algorithms operate on the error, there are some that do not operate on the error. Of course, other variations are possible and readily contemplated by one of ordinary skill in the related art.

The Autotune Adaptors 230 may operate in a synchronous or asynchronous manner. "Synchronous" means that the Autotune Adaptor 230 is invoked just prior to computing the new control value. In asynchronous mode, the Autotune Adaptor 230 is assumed to be invoked on its own at some other (user-defined) frequency to obtain the latest Metric values. This feature allows us to implement Autotune controllers where the control frequency is not the same as the sensing frequency.

In computing errors from the desired service level, the Autotune controller may access any of the Metrics known to the Metric Manager 240, as necessary.

The user-interface for each of the components (Metric Manager 240, Autotune Adaptor 230, Autotune Controllers 210, 220) is provided through Customizers 270, 280, 290. Customizers are entities that provide a GUI to the low-level details of each component. In the illustrative embodiments described herein, there is one Customizer for each element that is part of an agent. Of course, other arrangements are possible, including, but not limited to one Customizer for each type of element (e.g., Autotune controller, adaptor, and so forth) that is part of an agent. In the case of the Metric Manager 240, for example, Customizers allow a user to specify which metrics are to be logged, the location of the log file, and so forth. In the case of an Autotune Controller, they allow us to set the control frequency, select the Master Autotune Controller, etc. For the Autotune Adaptor 230, we may choose the operation mode: synchronous/asynchronous and also set the tuning control manually (in case we do not want the automated agent to operate). The Customizers 270, 280, 290 also provide a way to expose the available Metrics to the user, so that real-time monitoring may be performed.

We now provide concrete examples of how this framework can be used to easily create software agents for controlling a wide variety of computer systems. In order to instantiate a particular agent, one needs the following components: Autotune Adaptors for each target system, and one (or more) control algorithms.

Figure 4:
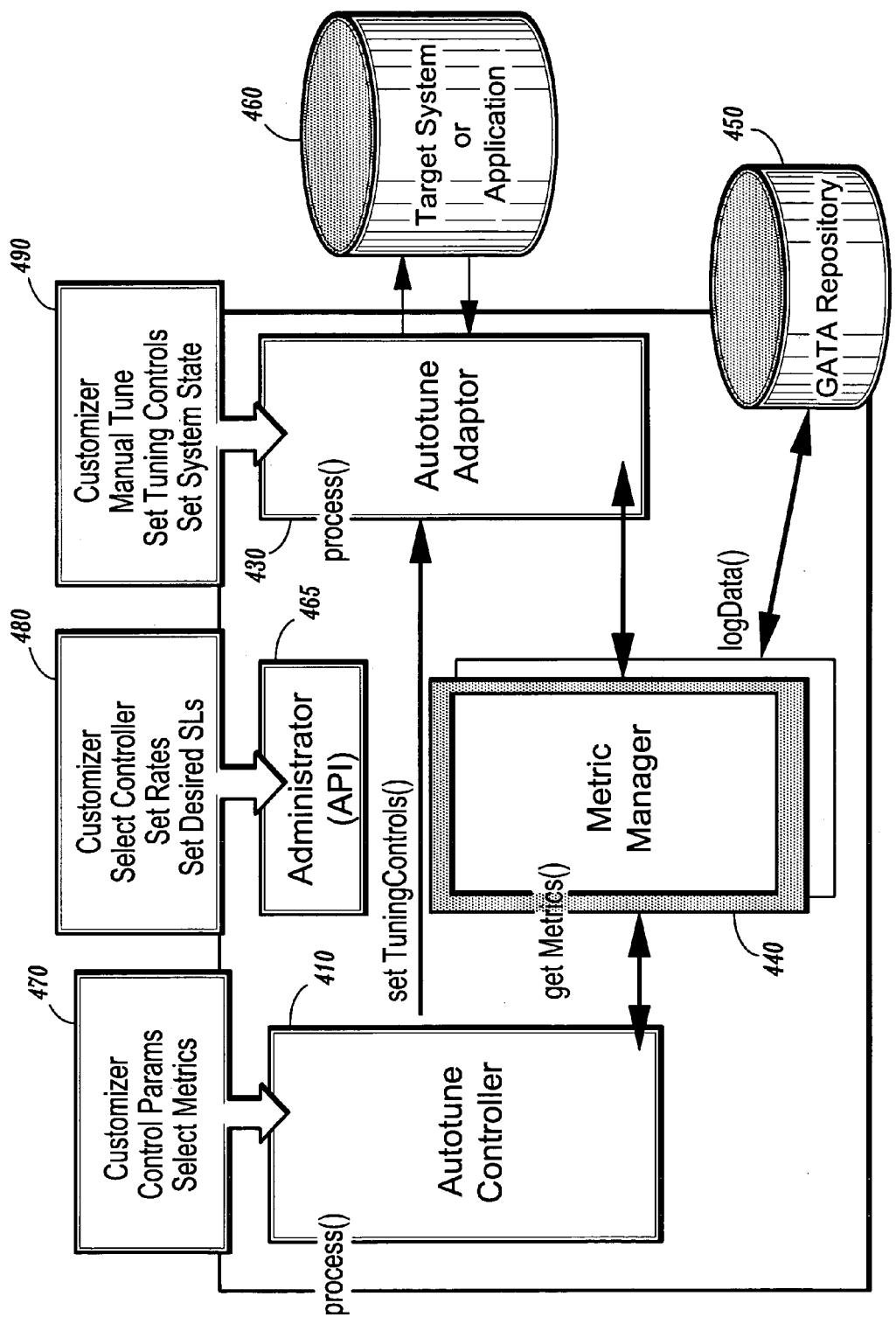
FIG. 4 is a block diagram illustrating a simple agent for controlling a single application using a single control method, according to an illustrative embodiment of the present invention.

FIG. 4 is a block diagram illustrating a simple agent for controlling a single application using a single control method, according to an illustrative embodiment of the present invention. The software agent of FIG. 4 includes: a single Autotune Controller 410; an Autotune Adaptor 460; a repository 450; a metric manager 440; an administrator API 465; customizers 470, 480, and 490. The software agent of FIG. 4 interacts with a target systems or other Autotune Agents (hereinafter interchangeably referred to as "target system" or "other Autotune Agent") 460.

The basic agent creation process for a scenario with a single target system and a single control algorithm (as in FIG. 4) is shown with respect to FIG. 8 below.

The same Agent, using the same control strategy can be targeted to a different system simply by replacing the current Adaptor component with that for the new target system. This enables reuse of existing knowledge. Similarly, the control algorithm can be easily changed by replacing the Controller module.

Figure 5:
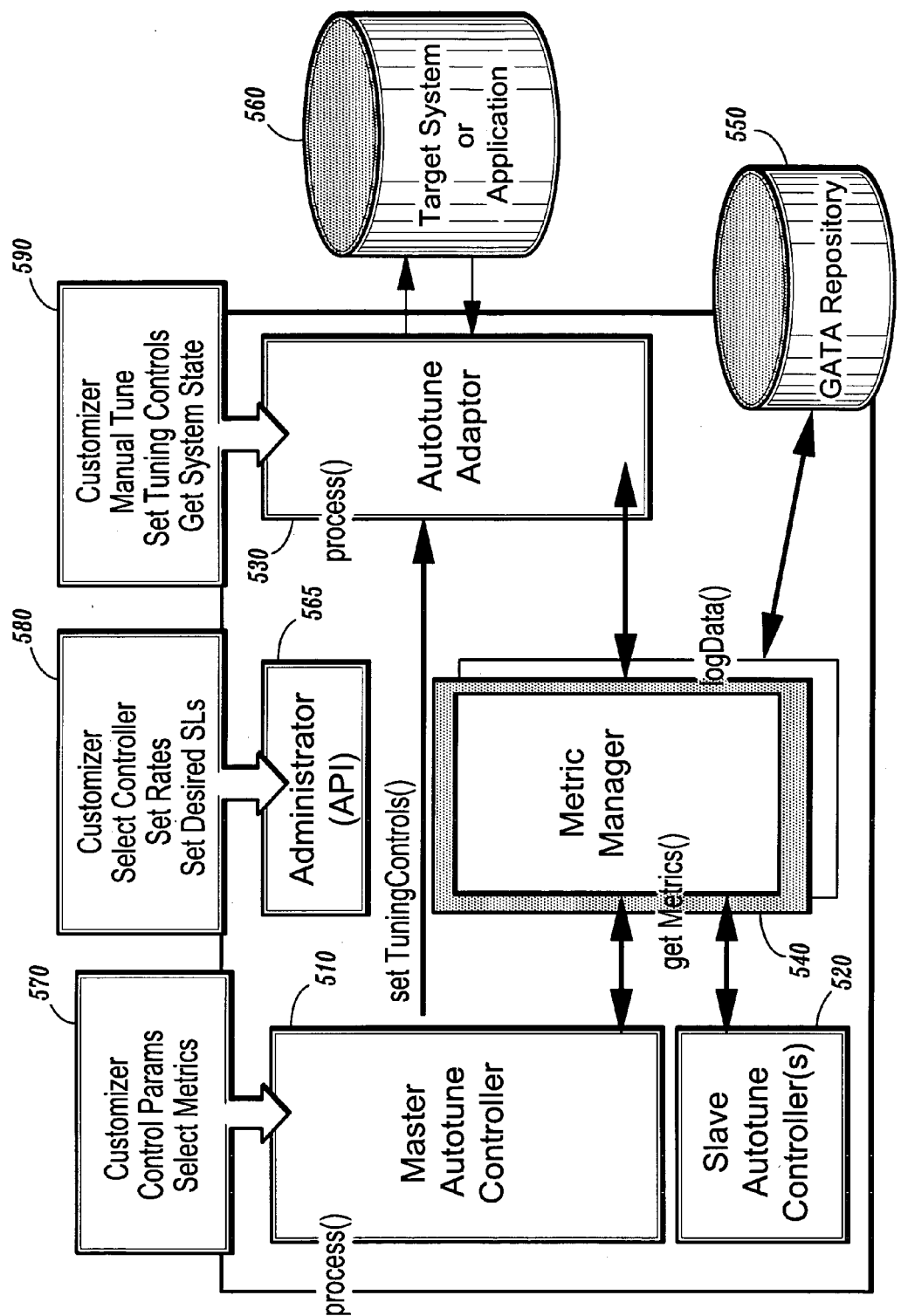
FIG. 5 is a block diagram illustrating how multiple control strategies can be included in a single agent, according to an illustrative embodiment of the present invention.

FIG. 5 is a block diagram illustrating how multiple control strategies can be included in a single agent, according to an illustrative embodiment of the present invention.

The software agent of FIG. 5 includes: a master Autotune Controller 510; one or more slave Autotune Controllers (hereinafter "slave Autotune Controller") 520; an Autotune Adaptor 560; a repository 550; a metric manager 540; an administrator API 565; customizers 570, 280, and 290. The software agent of FIG. 5 interacts with a target system or another Autotune Agent (hereinafter interchangeably referred to as "target system" or "other Autotune Agent") 560.

Here, the master Autotune Controller 510 implements the top-level control strategy that utilizes multiple lower-level control strategies to compute the control value. This agent can be created as described with respect to FIG. 8 below.

Figure 6:
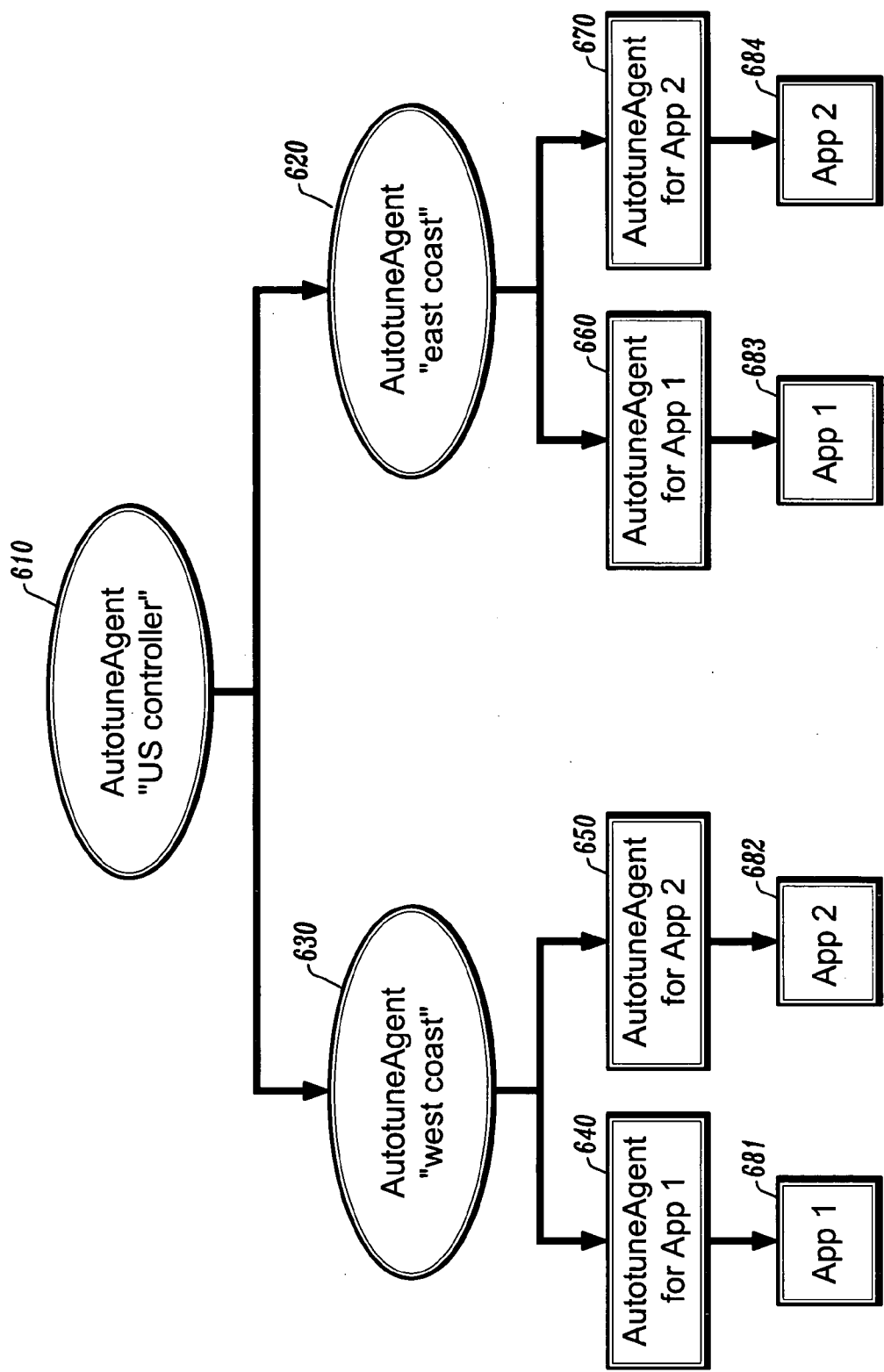
FIG. 6 is a block diagram depicting a hierarchical control configuration, according to an illustrative embodiment of the present invention.

FIG. 6 is a block diagram depicting a hierarchical control configuration, according to an illustrative embodiment of the present invention. Here, the "US Autotune agent" 610 in turn invokes the "East coast" 620 and "West coast" 630 Autotune agents, and these in turn invoke their subordinates 640, 650, 660, 670. The subordinates 640, 650, 660, and 670 respectively control/manage app 1 681, app 2 682, app 3 683, and app 4 684. This hierarchy can be implemented by a controller at each level of the hierarchy.

Figure 7:
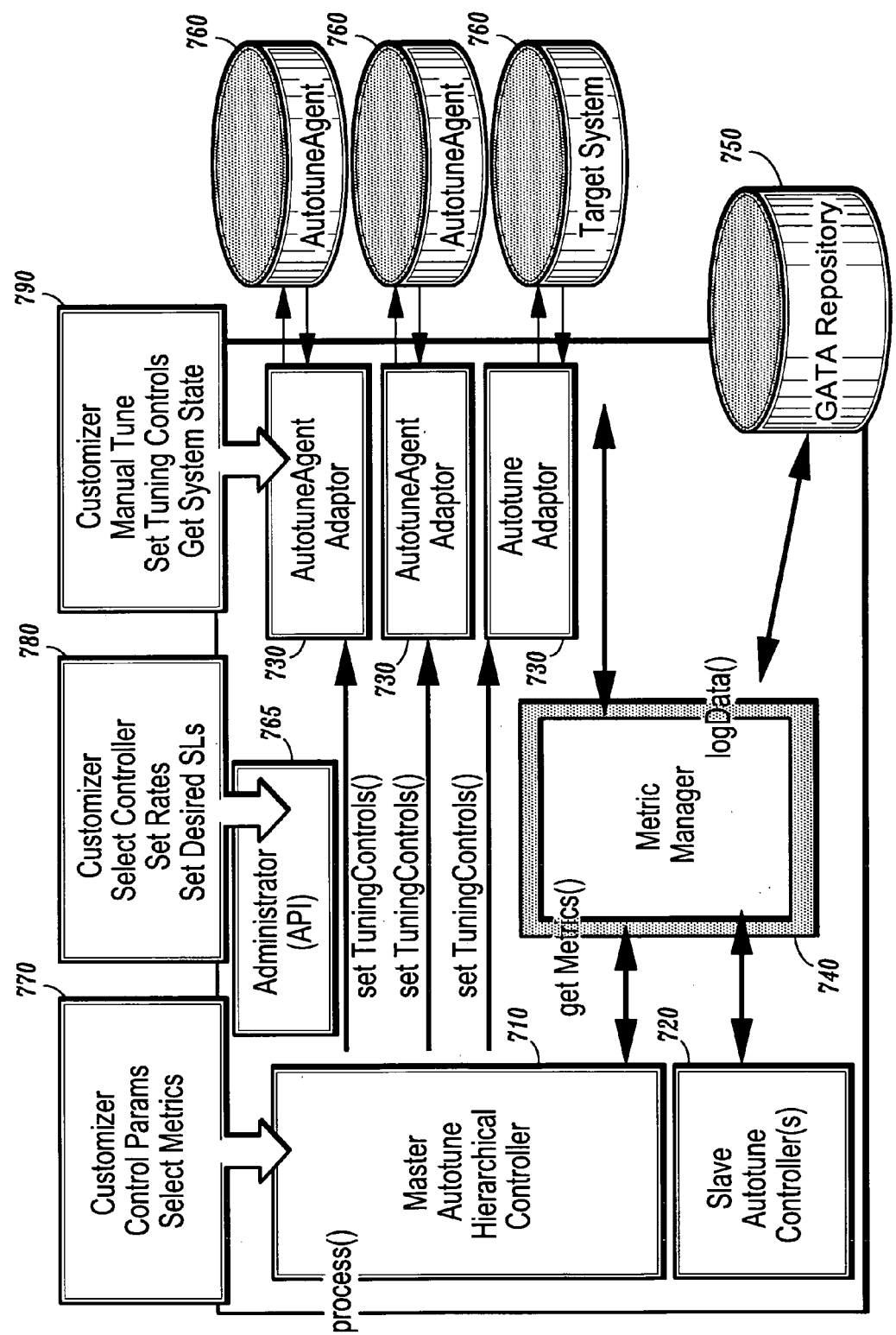
FIG. 7 is a block diagram of an agent that is part of the hierarchical control configuration of FIG. 6, according to an illustrative embodiment of the present invention.

FIG. 7 is a block diagram of an agent that is part of the hierarchical control configuration of FIG. 6, according to an illustrative embodiment of the present invention. In particular, a controller (a master Autotune hierarchical controller 710) at an internal node of the hierarchy is depicted in FIG. 7. In the embodiment, it is interesting to note that for the higher-level agents, the target system is one of the lower-level agents! This recursion is made possible by an Autotune Agent Adaptor 730 that provides the standard Adaptor interface to another Autotune Agent 760. This example illustrates the full generality of our framework, and illustrates that we can easily build complex chains of agents and controllers using the same framework. In addition to the master Autotune hierarchical controller 710, the Autotune Agent Adaptor 730, and the another Autotune Agent 760, the embodiment of FIG. 7 further includes: one or more slave Autotune Controllers (hereinafter "slave Autotune Controller") 720; a repository 750; a metric manager 740; an administrator API 765; customizers 770, 780, and 790.

Figure 8:
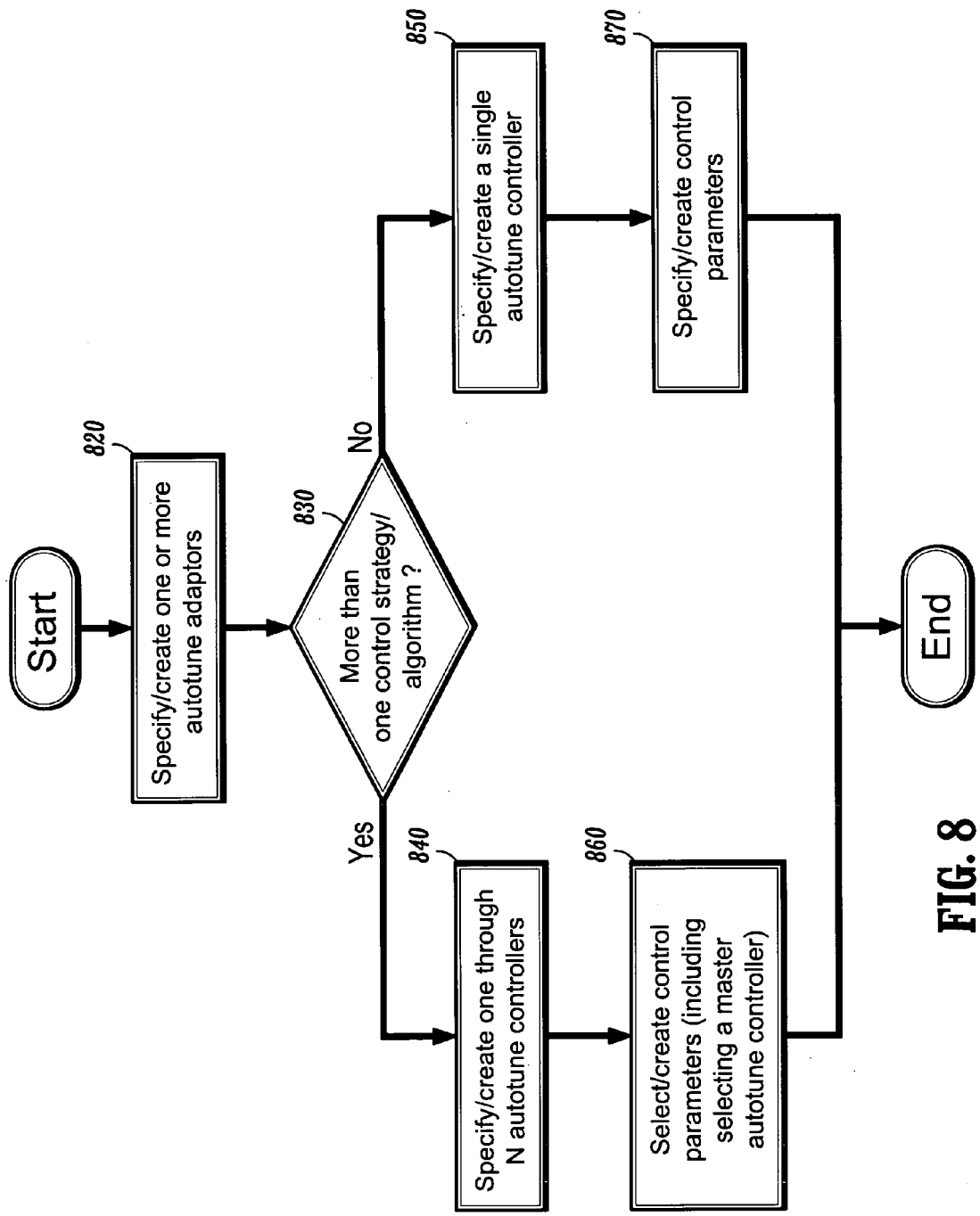
FIG. 8 is a flow diagram illustrating a method for creating an Autotune software agent, according to an illustrative embodiment of the present invention.

FIG. 8 is a flow diagram illustrating a method for creating an Autotune agent, according to an illustrative embodiment of the present invention. It is to be appreciated that some of the steps of the method of FIG. 8 state "specify/create" with respect to certain elements of the Autotune agent. This allows a user to either create the element or use a currently existing element, depending on the needs of the user and the tuning to be performed on the target system.

One or more Autotune Adaptors are specified/created (step 820). It is then determined whether the agent is to employ more than one control strategy or control algorithm (step 830). If so, then 1 through N (N≧2) Autotune Controllers are specified/created (step 840), and the method proceeds to step 860. Otherwise, a single Autotune controller is specified/created (step 850), and the method proceeds to step 870.

At steps 860 and 870, control parameters are selected/generated via one or more customizers. Both of steps 860 and 870 may include selecting parameters such as, for example, a controller frequency, synchronous/asynchronous mode, logging metrics, and so forth. However, step 860 must include selecting a master Autotune Controller from among the 1 through N Autotune controllers.

It is to be appreciated that the present invention provides a generic, automated tuning system. Advantageously, the present invention does not require experts to incorporate detailed knowledge of a target system into the tuning system. rather, the present invention may learn the target's performance characteristics. This may include having a generic automated tuning system according to the present invention exploit prior knowledge of the target system, when such knowledge is available, reliable, and durable.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A computer-implemented method for automatically tuning one or more target systems, comprising the steps of:
   managing at least one set of metrics corresponding to the one or more target systems;
   providing one or more controllers to implement one or more control strategies for adaptively tuning performance characteristics of the one or more target systems based upon the at least one set of metrics, wherein the one or more control strategies are independent of a particular architecture of any of the one or more target systems;
   providing one or more adaptors to provide an abstract interface to the one or more target systems with respect to the one or more control strategies, wherein at least one of the one or more adaptors is specific to a corresponding one of the one or more target systems;
   automatically invoking the one or more adaptors (i) to obtain metric values from the one or more target systems to compute tuning control values, and (ii) to tune the one or more target systems using the computed tuning control values,
   wherein said step of providing the one or more controllers comprises the step of selecting the one or more controllers from a plurality of controllers.

2. A computer-implemented method for automatically tuning one or more target systems, comprising the steps of:
managing at least one set of metrics corresponding to the one or more target systems;
providing one or more controllers to implement one or more control strategies to adaptively tune performance characteristics of the one or more target systems based upon the at least one set of metrics, wherein the one or more control strategies are independent of a particular architecture of any of the one or more target systems;
providing one or more adaptors to provide an abstract interface to the one or more target systems with respect to the one or more control strategies, wherein at least one of the one or more adaptors is specific to a corresponding one of the one or more target systems;
automatically invoking the one or more adaptors (i) to obtain metric values from the one or more target systems to compute tuning control values, and (ii) to tune the one or more target systems using the computed tuning control values,
wherein said step of providing the one or more adaptors comprises the step of selecting the one or more adaptors from a plurality of adaptors.

3. A computer-implemented method for automatically tuning one or more target systems, comprising the steps of:
managing at least one set of metrics corresponding to the one or more target systems;
providing one or more controllers to implement one or more control strategies to adaptively tune performance characteristics of the one or more target systems based upon the at least one set of metrics, wherein the one or more control strategies are independent of a particular architecture of any of the one or more target systems;
providing one or more adaptors to provide an abstract interface to the one or more target systems with respect to the one or more control strategies, wherein at least one of the one or more adaptors is specific to a corresponding one of the one or more target systems;
automatically invoking the one or more adaptors (i) to obtain metric values from the one or more target systems to compute tuning control values, and (ii) to tune the one or more target systems using the computed tuning control values; and
providing at least one customizer to receive user inputs to customize at least one of said metric manager, said one or more controllers, and said one or more adaptors, the at least one customizer being a graphical user interface.

4. A computer-based tuning system for automatically tuning one or more target systems, comprising:
a metric manager to manage at least one set of metrics corresponding to the one or more target systems, wherein the set of metrics comprise read-only metrics and read/write metrics;
one or more controllers to implement one or more control strategies to adaptively tune performance characteristics of the one or more target systems based upon the at least one set of metrics, wherein the one or more control strategies are independent of a particular architecture of any of the one or more target systems, and
one or more adaptors to provide an abstract interface to the one or more target systems with respect to the one or more control strategies, wherein at least one of the one or more adaptors is specific to a corresponding one of the one or more target systems,
wherein the one or more controllers invoke the one or more adaptors (i) to obtain metric values from the one or more target systems to compute tuning control values, and (ii) to tune the one or more target systems using the computed tuning control values.

5. The tuning system of claim 4, wherein each of the one or more control strategies corresponds to a separate computer program.

6. The tuning system of claim 4, wherein more than one of the one or more controllers is employed in a given application of the tuning system to a given one of the one or more target systems.

7. The tuning system of claim 4, wherein at least some of the one or more controllers are modular and are configured to be deleted from the tuning system, modified, or replaced.

8. The tuning system of claim 4, wherein at least some of the one or more adaptors are modular and are configured to be deleted from the tuning system, modified, or replaced.

9. The tuning system of claim 4, further comprising a shared facility to log metric changes.

10. A computer-based tuning system for automatically tuning one or more target systems, comprising:
a metric manager to manage at least one set of metrics corresponding to the one or more target systems;
one or more controllers to implement one or more control strategies to adaptively tune performance characteristics of the one or more target systems based upon the at least one set of metrics, wherein the one or more control strategies are independent of a particular architecture of any of the one or more target systems, and
one or more adaptors to provide an abstract interface to the one or more target systems with respect to the one or more control strategies, wherein at least one of the one or more adaptors is specific to a corresponding one of the one or more target systems,
wherein the one or more controllers invoke the one or more adaptors (i) to obtain metric values from the one or more target systems to compute tuning control values, and (ii) to tune the one or more target systems using the computed tuning control values,
wherein said one or more controllers comprise a master controller to resolve conflicts between the one or more control strategies.

11. The tuning system of claim 4, wherein said one or more adaptors directly obtain latest values of the read-only metrics from the one or more target systems.

12. The tuning system of claim 4, wherein said one or more adaptors set values corresponding to the read/write metrics on the one or more target systems.

13. The tuning system of claim 4, wherein said metric manager is configured to add, delete and list the at least one set of metrics.

14. The tuning system of claim 4, wherein the tuning system is configured to invoke other tuning systems to form a hierarchical tuning system with respect to the one or more target systems.

15. The tuning system of claim 14, wherein the tuning system and the other tuning systems operate cooperatively to implement the one or more control strategies.

16. The tuning system of claim 4, further comprising an administrator application programming interface (API) to specify service-level requirements of the one or more target systems.

17. The tuning system of claim 4, further comprising an administrator application programming interface (API) to monitor an operation of the tuning system.

18. A computer-based tuning system for automatically tuning one or more target systems, comprising:
a metric manager to manage at least one set of metrics corresponding to the one or more target systems;

one or more controllers to implement one or more control strategies to adaptively tune performance characteristics of the one or more target systems based upon the at least one set of metrics, wherein the one or more control strategies are independent of a particular architecture of any of the one or more target systems, and one or more adaptors to provide an abstract interface to the one or more target systems with respect to the one or more control strategies, wherein at least one of the one or more adaptors is specific to a corresponding one of the one or more target systems, wherein the one or more controllers invoke the one or more adaptors (i) to obtain metric values from the one or more target systems to compute tuning control values, and (ii) to tune the one or more target systems using the computed tuning control values, wherein said metric manager is configured to receive an input specifying at least a subset of metrics to be stored from among the at least-one set of metrics.

19. A computer-based tuning system for automatically tuning one or more target systems, comprising:

a metric manager to manage at least one set of metrics corresponding to the one or more target systems;

one or more controllers to implement one or more control strategies to adaptively tune performance characteristics of the one or more target systems based upon the at least one set of metrics, wherein the one or more control strategies are independent of a particular architecture of any of the one or more target systems, and one or more adaptors to provide an abstract interface to the one or more target systems with respect to the one or more control strategies, wherein at least one of the one or more adaptors is specific to a corresponding one of the one or more target systems, wherein the one or more controllers invoke the one or more adaptors (i) to obtain metric values from the one or more target systems to compute tuning control values, and (ii) to tune the one or more target systems using the computed tuning control values; and at least one customizer to receive user inputs to customize at least one of said metric manager, said one or more controllers, and said one or more adaptors, wherein a user interacts with the at least one customizer using a graphical user interface.

20. The tuning system of claim 19, wherein said customizer receives the user inputs to set default values for at least one of said metric manager, said one or more controllers, and said one or more adaptors.

21. The tuning system of claim 19, wherein said customizer receives the user inputs to select a number of said one or more adaptors that is to be employed in a given application of the tuning system to a given one of the one or more target systems.

22. The tuning system of claim 19, wherein said customizer receives the user inputs to select one or more types of said one or more adaptors that is to be employed in a given application of the tuning system to a given one of the one or more target systems.

23. The tuning system of claim 19, wherein said customizer receives the user inputs to select a number of said one or more controllers that is to be employed in a given application of the tuning system to a given one of the one or more target systems.

24. The tuning system of claim 19, wherein said customizer receives the user inputs to select one or more types of said one or more controllers that is to be employed in a given application of the tuning system to a given one of the one or more target systems.

\* \* \* \* \*